United States Patent [19]

Presnell et al.

[11] Patent Number: 5,049,171
[45] Date of Patent: Sep. 17, 1991

[54] OIL/AIR SEPARATOR

[75] Inventors: J. D. Presnell, Mocksville; David C. Phelps, Clemmons, both of N.C.

[73] Assignee: Ingersoll-Rand Company, Woodcliff Lake, N.J.

[21] Appl. No.: 469,700

[22] Filed: Jan. 22, 1990

Related U.S. Application Data

[63] Continuation of Ser. No. 342,142, Apr. 24, 1988, abandoned, which is a continuation-in-part of Ser. No. 170,259, Mar. 18, 1988, abandoned.

[51] Int. Cl.⁵ .............................................. B01D 53/24
[52] U.S. Cl. ........................................ 55/338; 55/456; 55/DIG. 23
[58] Field of Search ............... 55/338, 456, 447, 459.1, 55/459.3, 459.4, 459.5, 462, 446, DIG. 23

[56] References Cited

U.S. PATENT DOCUMENTS

| | | |
|---|---|---|
| 386,173 | 7/1888 | White . |
| 926,206 | 6/1909 | Morse .............................. 55/418 |
| 2,087,464 | 7/1937 | Ayers . |
| 2,298,285 | 10/1942 | Fletcher ........................ 55/459.1 |
| 2,523,614 | 9/1950 | Elverum ......................... 55/459.1 |
| 2,767,840 | 10/1956 | Dobson et al. .................. 55/459.1 |
| 3,116,238 | 12/1963 | Van Etten ....................... 55/459.1 |
| 3,225,523 | 12/1965 | Wiebe ............................. 55/459.1 |
| 3,654,748 | 4/1972 | Bloom . |
| 3,731,467 | 5/1973 | Jennings ......................... 55/459.4 |
| 3,820,310 | 6/1974 | Fromknecht et al. . |
| 3,853,518 | 12/1974 | Tu et al. ........................ 55/459.1 |
| 4,290,791 | 9/1981 | Matsui et al. .................. 55/459.4 |
| 4,302,227 | 11/1981 | Miller . |
| 4,563,138 | 1/1986 | Hofmann et al. . |
| 4,671,214 | 6/1987 | Alias et al. . |

FOREIGN PATENT DOCUMENTS 2822780 12/1978 Fed. Rep. of Germany .

Primary Examiner—Jeffery Thurlow
Assistant Examiner—Mathieu Vargot
Attorney, Agent, or Firm—James R. Bell

[57] ABSTRACT

An oil/air separator includes a tank having a cylindrical wall and opposed end walls. The first channel wall has a bend portion therein and a cap portion normal thereto which interconnects the first channel wall with the cylindrical wall. The first channel wall further includes a first end and a second end, each of which is spaced from the cylindrical wall. A second channel wall is also positioned within the tank between and substantially axially aligned with the cylindrical and first channel walls. The second channel wall is spaced from each of the cylindrical and first channel walls and also has a bend portion therein. The second channel wall has a cap and a base portion which are spaced apart by and normal to the second channel wall. The second channel wall further includes a first end engaged with the cylindrical wall and a second end spaced from the cylindrical wall. The cylindrical wall has an inlet for admitting an oil/air mixture into the tank. The inlet is opposite the second channel wall and is between the cap and base portions thereof.

5 Claims, 4 Drawing Sheets

OIL/AIR SEPARATOR

This application is a filed wrapper continuation of application Ser. No. 342,142, filed Apr. 24, 1989, now abandoned, which is a continuation-in-part of co-pending U.S. patent application Ser. No. 170,259, filed on Mar. 18, 1988, now abandoned, by J. D. Presnell and David C. Phelps and assigned to the assignee of the present invention.

BACKGROUND OF THE INVENTION

This invention relates generally to oil/air separators which cycle oil/air mixtures therewithin to separate the oil from the air, and more particularly to such a separator which has means for channeling the flow of separated oil therewithin.

Oil/air separators known in the prior art have deflectors to turn the entering oil/air mixture from a radial flow to a centrifugal flow. This is to enable centrifugal force to cause the heavier oil particles to collect on the circumferential wall of the separator and drain to a bottom tap or conduit. However, no matter how gradually a deflector may be paired with the separator wall, it intrudes into the centrifugal flow, and presents an impingement surface. Consequently, cycling, centrifugally-migrating oil particles in the separator impact the surface and are dispersed universally, i.e., upwardly, downwardly, obliquely and radially, back into substantially oil-free air subsisting more centrally in the separator.

What is needed is an oil/air separator with means therewithin for capturing such dispersed oil particles and redirectingly constraining them again to a correct, centrifugal-force-inducing cyclic flow.

The foregoing illustrates limitations known to exist in present devices. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing an oil/air separator apparatus comprising a tank having a cylindrical wall. A first channel wall is positioned within the tank and is substantially axially aligned with the cylindrical wall. The first channel wall has a bend portion therein and a cap portion normal thereto which interconnects the first channel wall with the cylindrical wall. The first channel wall further includes a first end and a second end, each of which is spaced from the cylindrical wall. A second channel wall is also positioned within the tank between and substantially axially aligned with the cylindrical and first channel walls. The second channel wall is spaced from each of the cylindrical and first channel walls and also has a bend portion therein. The second channel wall has a cap and a base portion which are spaced apart by and normal to the second channel wall. The cap and base portions interconnect the second channel wall with the cylindrical wall. The cap portion of the second channel wall is spaced from the cap portion of the first channel wall. The second channel wall further includes a first end engaged with the cylindrical wall and a second end spaced from the cylindrical wall. The cylindrical wall has means for admitting an oil/air mixture into the tank. The means for admitting is opposite the second channel wall and is between the cap and base portions thereof.

The foregoing and other aspects will become apparent from the following detailed description of the invention when considered in conjunction with the accompanying drawing figures. It is to be expressly understood, however, that the drawing figures are not intended as a definition of the invention but are for the purpose of illustration only.

BRIEF DESCRIPTION OF THE DRAWING FIGURES

DETAILED DESCRIPTION

Figure 1:
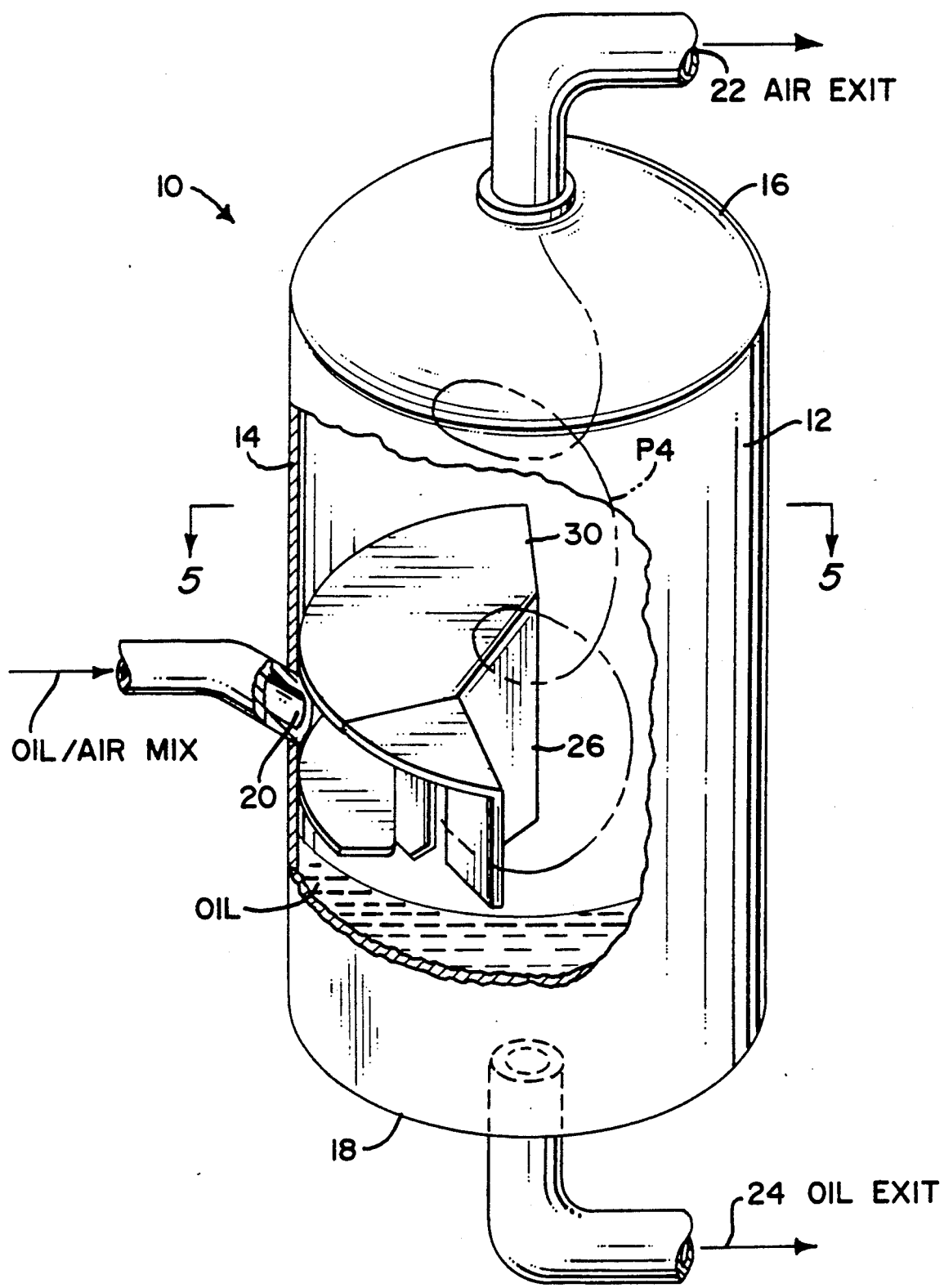
FIG. 1 is a perspective view illustrating an embodiment of the present invention.
Figure 3:
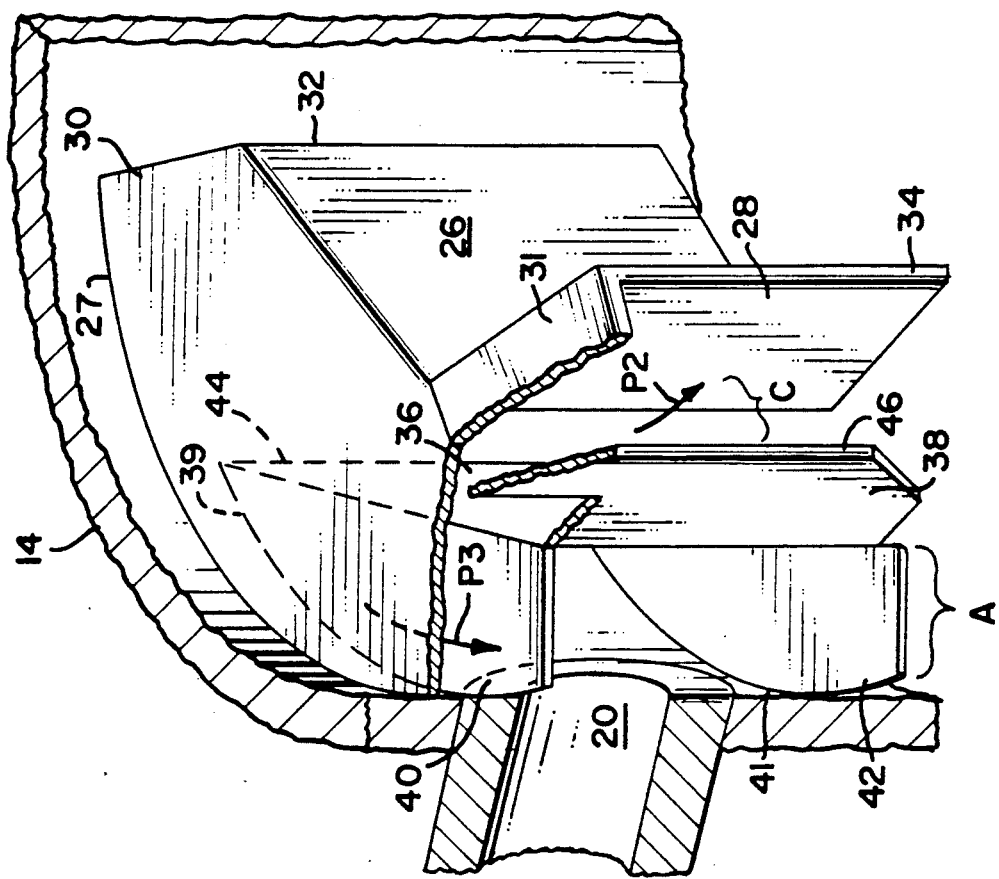
FIGS. 2, 3 and 4 are perspective views illustrating an embodiment of the channel walls of the present invention.
Figure 2:
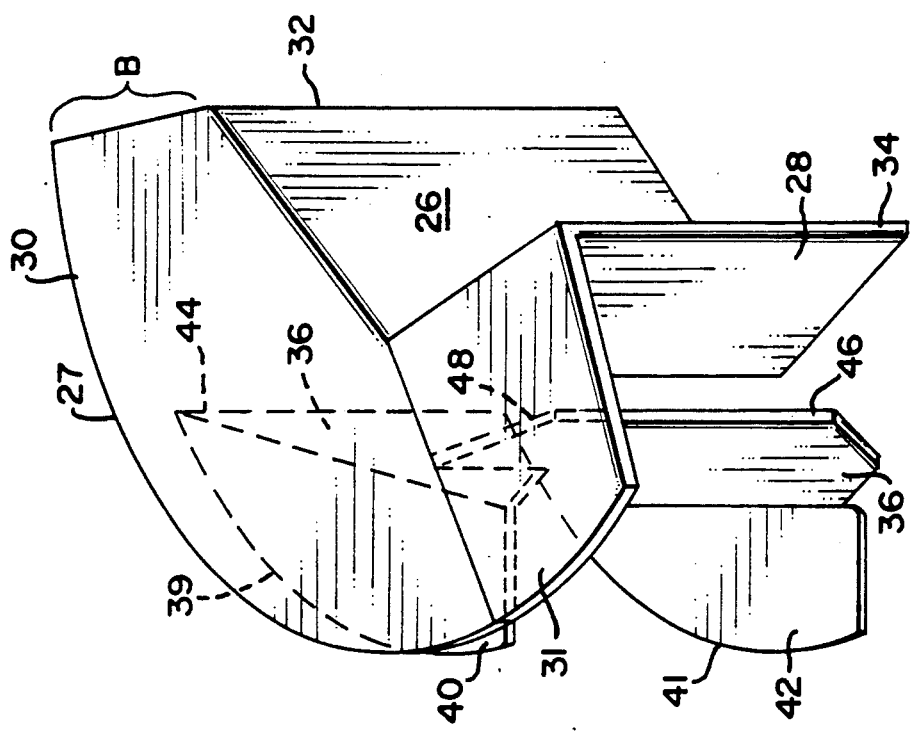
Figure 4:
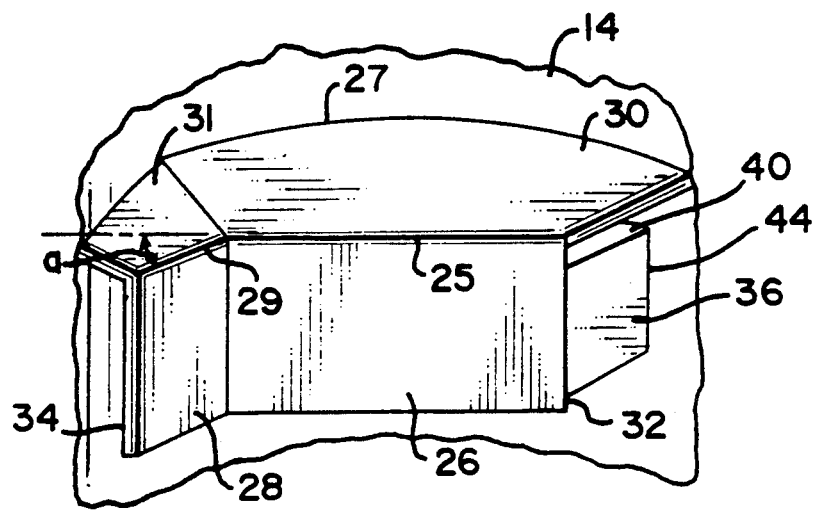
Figure 5:
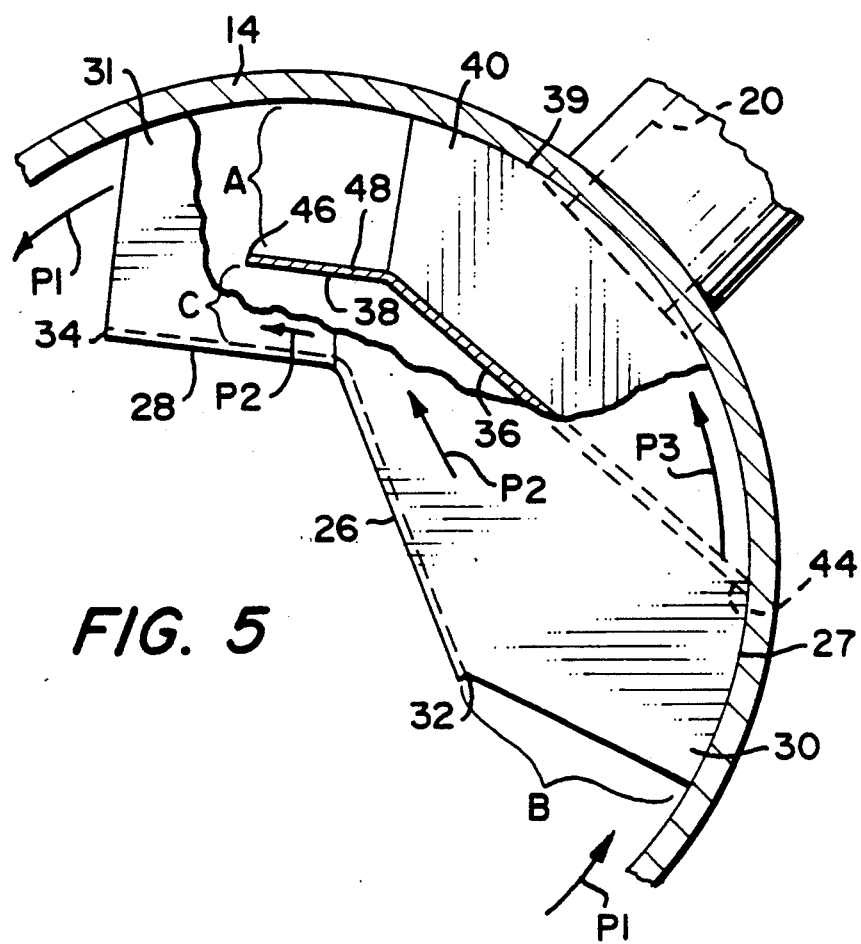
FIG. 5 is a top view taken along the line 5—5 of FIG. 1.

An oil/air separator apparatus is generally designated 10 in FIG. 1 and comprises a tank 12 having a cylindrical wall 14 and opposite ends 16, 18. Means such as a port 20 is provided in cylindrical wall 14 for admitting an oil/air mixture into tank 12. One of the ends 16 includes an air exit 22 and the other of the ends 18 includes an oil exit 24.

A first channel wall 26, FIGS. 1–5, is positioned within tank 12 and is substantially axially aligned with cylindrical wall 14. First channel wall 26 has a bend portion 28 therein. Wall 26 also has a cap portion 30, normal thereto, for interconnecting wall 26, by means of a curved edge 27, with cylindrical wall 14. A first end 32 of first channel wall 26 is spaced from cylindrical wall 14. A second end 34 of bend portion 28 of first channel wall 26 is also spaced from cylindrical wall 14. Bend portion 28 has an edge 29 angled at an angle designated a, with respect to edge 25 of first channel wall 26. Cap portion 30 includes a deflector 31 which is angled in accordance with the angle of edge 29.

A second channel wall 36, is positioned within the tank 12 between and substantially axially aligned with cylindrical wall 14 and first channel wall 26. Second channel wall 36 is spaced from each of the cylindrical wall 14 and the first channel wall 26, and also includes a bend portion 38. Second channel wall 36 also has a cap portion 40 spaced apart from a base portion 42, thereof. Cap and base portions 40, 42, respectively, are normal to second channel wall 36. Cap portion 40 interconnects second channel wall 36, by means of a curved edge 39, with cylindrical wall 14. Base portion 42 interconnects second channel wall 36, by means of a curved edge 41, with cylindrical wall 14. Cap portion 40 of second channel wall 36 is spaced from cap portion 30 of first channel wall 26. Second channel wall 36 has a first end 44 engaged with cylindrical wall 14, and has a second end 46 spaced from cylindrical wall 14 and spaced from second end 34 of first channel wall 26.

Bend portion 38 of second channel wall 36 includes means such as a tab 48 which supportively extends into engagement with cap portion 30 of first channel wall 26.

From the foregoing, it can be seen that an oil/air mixture is admitted into tank 12 via port 20, positioned opposite second channel wall 36 between cap portion 40 and base portion 42, thereof. Since first end 44 of second channel wall 36 is engaged with cylindrical wall 14 and second end 46 is spaced from cylindrical wall 14, second channel wall 36 is angularly disposed relative to cylindrical wall 14 and port 20. Thus the oil/air mixture is directed toward second end 46 and passes between second end 46 and cylindrical wall 14 via a passage designated A. The oil/air mixture is confined to move through passage A due to the presence of cap 40 and base 42. Thus, the oil/air mixture travels a centrifugal flow pattern designated P1, in tank 12, influenced by cylindrical wall 14. Because the oil has a greater density than the air, the centrifugal flow pattern causes some of the oil to tend to cling to wall 14 of tank 12 and settle toward oil exit 24.

Some of the oil/air mixture also continues in the centrifugal flow pattern P1 and eventually passes through a passage designated B defined by end 32 and wall 14 and impinges on second channel wall 36, thus redirecting the oil/air mixture in a flow pattern designated P2 between second channel wall 36 and first channel wall 26. The oil/air mixture exits from between second channel wall 36 and first channel wall 26 via a passage designated C defined by end 46 and bend portion 28. Also some of the mixture passing through passage B is not redirected by second channel wall 36 but moves in a flow pattern designated P3 along cylindrical wall 14 between caps 30 and 40. Together the flow patterns P1 and P3 are deflected by deflector 31, and are merged into flow pattern P1 with newly introduced oil/air mixture which enters flow pattern P1 via passage A.

As this cycle continues, oil droplets are continuously centrifuged from the above-mentioned flow patterns and gravitate toward oil exit 24. The resulting oil-free air however tends to flow toward the center of tank 12 and spirals via a flow pattern designated P4 toward air exit 22.

While this invention has been illustrated and described in accordance with a preferred embodiment, it is recognized that variations and changes may be made therein without departing from the invention as set forth in the claims.

What is claimed is:

1. An oil/air separator apparatus, comprising: a tank having a cylindrical wall;
    a first channel wall within the tank, substantially axially aligned with the cylindrical wall, the first channel wall having a bend portion therein, the first channel wall also having a cap portion normal thereto and interconnecting the first channel wall with the cylindrical wall, the first channel wall further having a first end and a second end each of which is spaced from the cylindrical wall;
    a second channel wall within the tank, positioned between and substantially axially aligned with the cylindrical and first channel walls, the second channel wall also having a cap and a base portion, the cap and base portions being spaced apart by and normal to the second channel wall, the cap and base portions interconnecting the second channel wall with the cylindrical wall, the cap portion of the second channel wall being spaced from the cap portion of the first channel wall, the second channel wall also having a first end engaged with the cylindrical wall and a second end spaced from the cylindrical wall, the first and second ends and the bend portion of the first channel wall being substantially adjacent to the first and second ends and the bend portion of the second channel wall, respectively, the first and second channel walls converging in a direction extending from the first ends thereof to the bend portion thereof, and being substantially parallel in a direction extending from the bend portions thereof to the second ends thereof;
    the cylindrical wall having means for admitting an oil/air mixture into the tank, the tank having opposite ends, one of the ends having an air exit and the other of the ends having an oil exit;
    the second channel wall being a means for directing the admitted oil/air mixture through a first passageway and into a first flow pattern adjacent the cylindrical wall; and
    the first channel wall being a means for redirecting a first portion of the mixture in the first flow pattern through a second passageway, separated from the first passageway and into a second flow pattern separated from the means for admitting and separated from the cylindrical wall, and for redirecting a second portion of the mixture in the first flow pattern through the second passageway and into a third flow pattern separated from the means for admitting and adjacent the cylindrical wall.

2. The oil/air separator apparatus as defined in claim 1, wherein the cap portion of the first channel wall includes a deflector directed toward the second channel wall.

3. The oil/air separator apparatus as defined in claim 2, wherein the bend portion of the second channel wall includes means for supporting the cap portion of the first channel wall.

4. The oil/air separator apparatus as defined in claim 3 wherein the means for supporting includes a tab extending from the bend portion of the second channel wall into engagement with the deflector.

5. An oil/air separator apparatus, comprising:
    a tank having a cylindrical wall and opposite ends, means in the cylindrical wall for admitting an oil/air mixture thereinto, one of the ends having an air exit and the other of the ends having an oil exit;
    a first channel wall within the tank, substantially axially aligned with the cylindrical wall, the first channel wall having a bend portion therein, the first channel wall also having a cap portion normal thereto and interconnecting the first channel wall with the cylindrical wall, the first channel wall further having a first end and a second end each of which is spaced from the cylindrical wall;
    a second channel wall within the tank, positioned between and substantially axially aligned with the cylindrical and first channel walls, the second channel also having a bend portion therein, the second channel wall also having a cap and a base portion, the cap and base portions being spaced apart by and normal to the second channel wall, the cap and base portions interconnecting the second channel wall with the cylindrical wall, the cap portion of the second channel wall being spaced from the cap portion of the first channel wall, the second channel wall also having a first end engaged with the cylindrical wall and a second end spaced from the cylindrical wall, the means for admitting being opposite the second wall and between the cap and base portions thereof, the first and second ends and the bend portion of the first channel wall being substantially adjacent to the first and second ends and the bend portion of the second channel wall, respectively, the first and second channel walls converging in a direction extending from the first ends thereof, and being substantially parallel in a direction extending from the bend portions thereof to the second ends thereof;

means for directing the mixture through a first passageway and into a first flow pattern adjacent the cylindrical wall; and means for redirecting a first portion of the mixture in the first flow pattern through a second passageway, separated from the passageway, and into a second flow pattern separated from the means for admitting and separated from the cylindrical wall, and for redirecting a second portion of the mixture in the first flow pattern through the second passageway and into a third flow pattern separated from the means for admitting and adjacent the cylindrical wall.

* * * * *